(12) United States Patent
D'Argenio et al.

(10) Patent No.: US 9,276,934 B2
(45) Date of Patent: Mar. 1, 2016

(54) SELF-ACTIVATION OF USER DEVICE

(71) Applicant: Cellco Partnership, Basking Ridge, NJ (US)

(72) Inventors: Michael J. D'Argenio, Green Brook, NJ (US); Lonnie Katai, Murphy, TX (US); Kristopher T. Frazier, McKinney, TX (US); Zachariah E. Nelson, Elizabeth, NJ (US); Matthew Santaiti, Basking Ridge, NJ (US); Abhishek S. Sheth, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 73 days.

(21) Appl. No.: 14/230,350

(22) Filed: Mar. 31, 2014

(65) Prior Publication Data
US 2015/0281235 A1  Oct. 1, 2015

(51) Int. Cl.
*H04L 29/06* (2006.01)
*G06F 21/44* (2013.01)
(52) U.S. Cl.
CPC ............ *H04L 63/0884* (2013.01); *G06F 21/44* (2013.01)

(58) Field of Classification Search
CPC ....................................................... H04L 63/18
USPC ............................................................ 726/7
See application file for complete search history.

(56) References Cited

U.S. PATENT DOCUMENTS

| | | | |
|---|---|---|---|
| 2002/0034940 A1* | 3/2002 | Takae et al. | 455/418 |
| 2011/0244878 A1* | 10/2011 | Kochetkov et al. | 455/456.1 |
| 2011/0291814 A1* | 12/2011 | Faith | 340/10.5 |
| 2012/0171995 A1* | 7/2012 | Krafzik et al. | 455/411 |

* cited by examiner

*Primary Examiner* — Jason K Gee

(57) ABSTRACT

A first user device and second user device may be coupled, such as by an audio interface included in the second user device. The second user device is unable to generate a registration request, and the first user device may acquire device data associated with the second user device and form the registration request. The registration request may include the device data and information associated with the first user device. The registration request may be authenticated, and activation data may be generated based on the information associated with the first user device and the device data. The activation data is forwarded to the second user device to enable the second user device to access a restricted service or data.

20 Claims, 12 Drawing Sheets

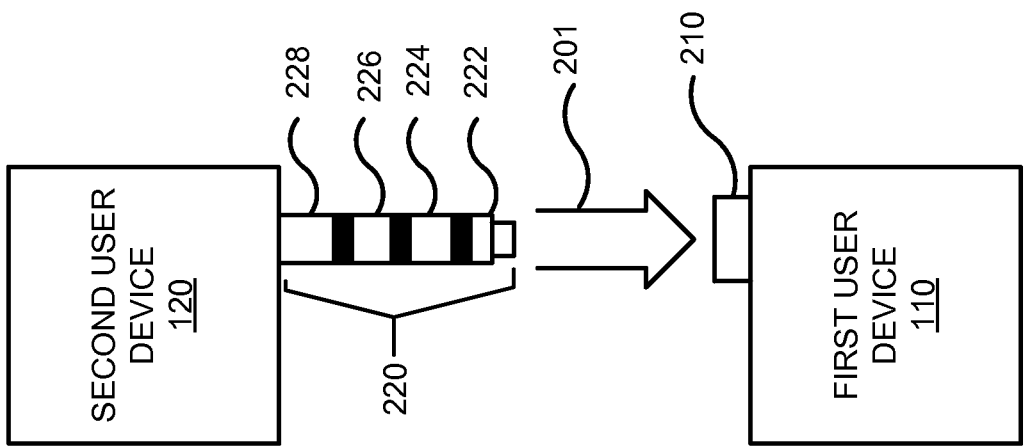

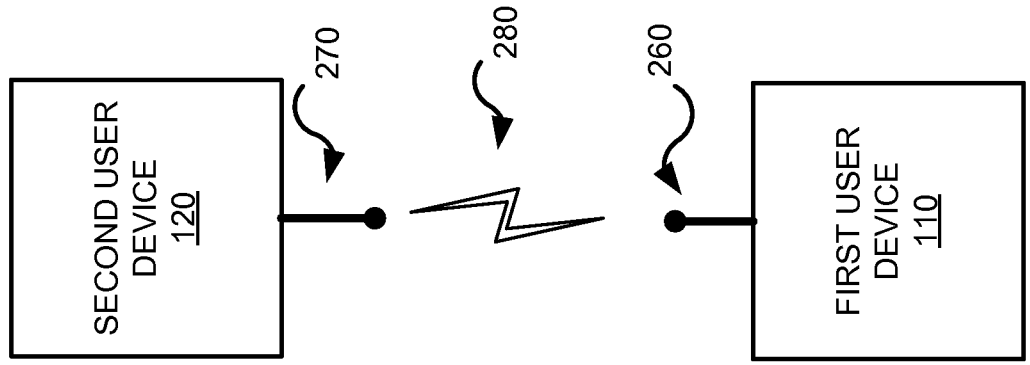
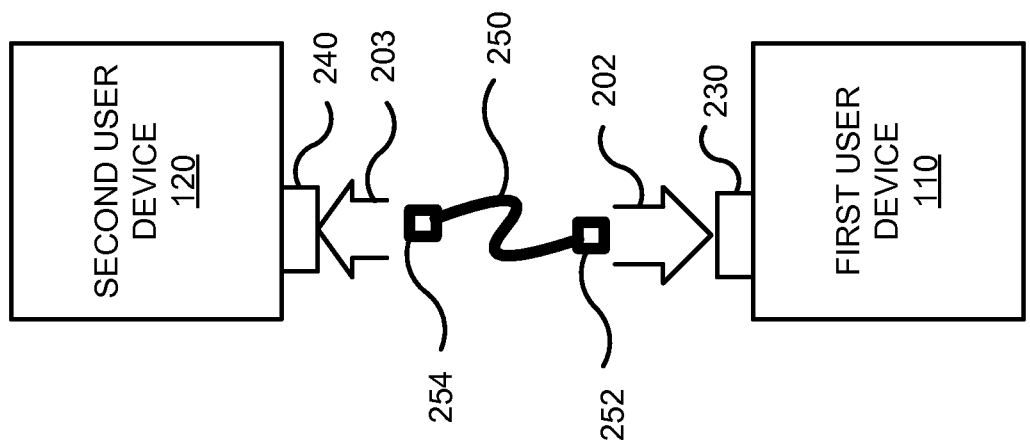

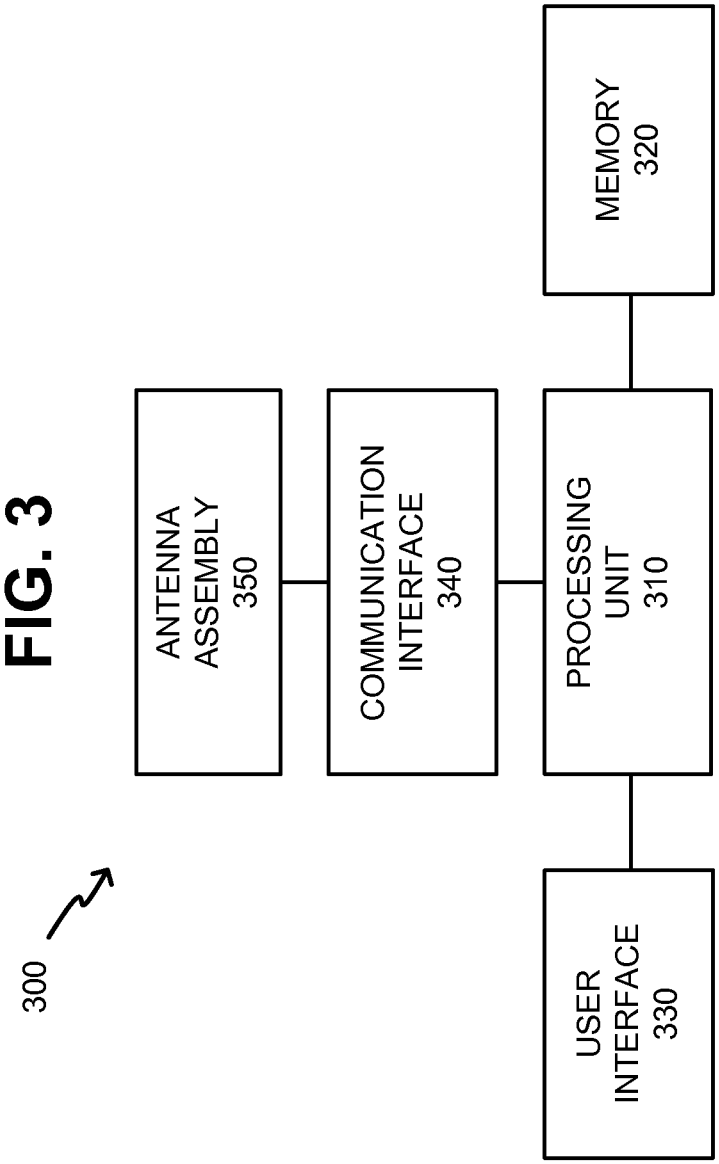

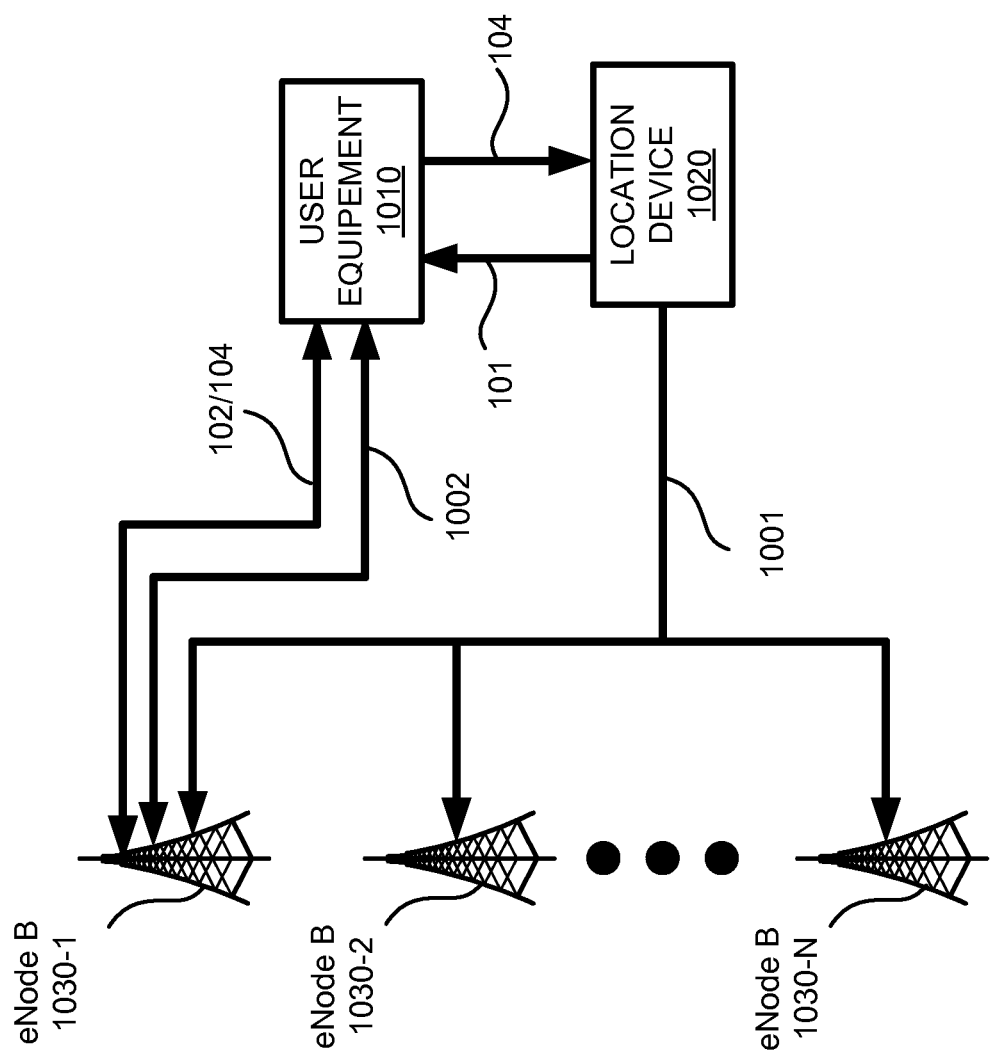

SELF-ACTIVATION OF USER DEVICE

BACKGROUND

Before a service provider allows a user device to access restricted resources, such as connecting to a network managed by the service provider, accessing content, etc., the user device is generally registered to associate the new device with a user and to receive information associated with the user, such as billing information for charging the user for services. After the user device is registered, the user device may be configured to access the restricted resources.

BRIEF DESCRIPTION OF THE DRAWINGS

FIGS. 2A-2C show examples of connections between user devices included in the environment of FIG. 1;

FIG. 3 shows a diagram of exemplary components that may be included in a user device included in the environment shown in FIG. 1;

FIG. 10 shows an exemplary system in which user devices included in the environment of FIG. 1 may operate after being activated by the processes of FIGS. 5-7.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein relate to coupling a first user device and second user device. The first user device may acquire device data associated with the second user device and form a registration request that includes the device data and information associated with the first user device. The first user device may forward the registration request to a registration device that authenticates the second user device based on the information associated with the first user device. Activation data may be determined based on the device data, and activation data may be forwarded to the second user device to enable the second user device to access a restricted service or data.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1A:
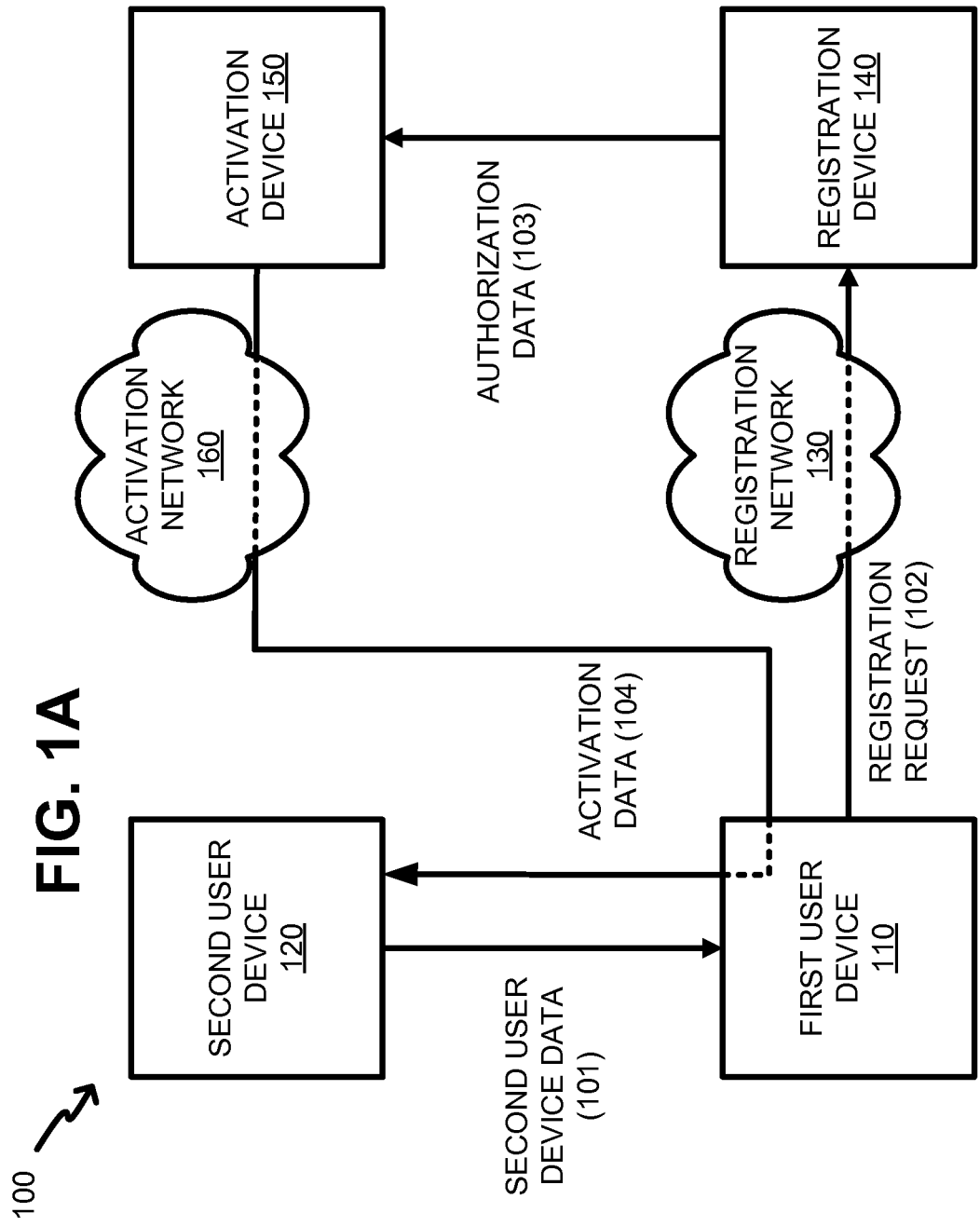
FIGS. 1A and 1B show exemplary devices that may be included in an environment in which systems and/or methods described herein may be implemented for user-initiated activation of a user device included in the environment.
Figure 1B:
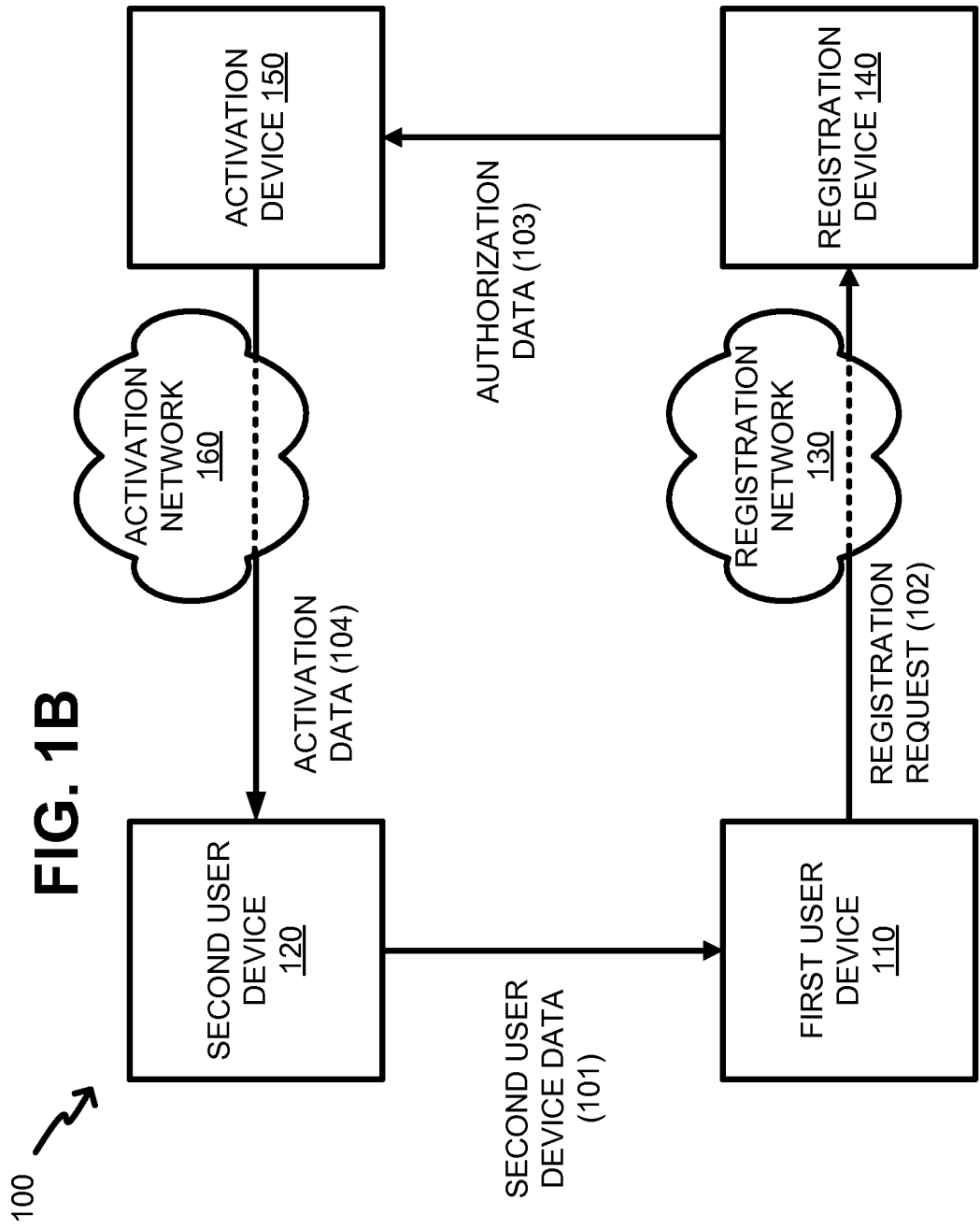

FIGS. 1A and 1B are diagrams of an exemplary environment 100 in which systems and methods described herein may be implemented. As illustrated in FIGS. 1A and 1B, environment 100 may include a first user device 110 that may be coupled to a second user device 120 to receive second user device data 101. First user device 110 may generate a registration request 102 using the second user device data 101 and may forward registration request 102 to a registration device 140 via a registration network 130. Registration device 140 may evaluate registration request 102 and may forward authorization data 103 to an activation device 150 when registration request 102 is accepted. Activation device 150 may then forward activation data 104 via activation network 160 directly or indirectly to, and used by, second user device 120.

Continuing with environment 100, first user device 110 and second user device 120 may include any devices that are capable of communicating to exchange second user device data 101. For example, user devices 110 and 120 may include a laptop computer, a tablet computer, a notebook computer, a personal computer (PC), an ultra mobile personal computer (UMPC), a netbook, a game-playing device/console, or other types of computation or communication devices, threads or processes running on these devices, and/or objects executable by these devices. User devices 110 and 120 may also include a communication device, such as a voice over Internet protocol (VoIP) telephone (e.g., a session initiation protocol (SIP) telephone), a personal digital assistant (PDA) that can include a radio, a mobile telephone (e.g., a cell phone), a smart phone (e.g., that may combine a cellular radio with data processing and data communications capabilities), a personal locator device (e.g., a device that outputs a location signal), a short messaging service (SMS) device (e.g., a pager), etc.

In one implementation, first user device 110 may include a user interface (e.g., user input/output components) to receive and provide information to an associated user whereas second user device 120 may be a "headless" device that does not include user input/output components.

As described in greater detail with respect to FIGS. 2A-2C, first user device 110 and second user device 120 may be coupled to exchange second user device data 101, activation data 104, etc.

Returning to FIGS. 1A and 1B, second user device data 101 may include, for example, information identifying second user device 120. For example, second user device data 101 may identify a model number and a manufacturer associated with second user device 120. Additionally or alternatively, second user device data 101 may include a device identifier, such as a serial number, an international mobile station equipment identity (IMEI) number, a mobile equipment identifier (MEID), etc. Second user device data 101 may identify services and/or resources requested by second device 120. For example, second user device data 101 may identify a requested communication channel and/or an application to be accessed by second user device 120.

Continuing with environment 100 in FIGS. 1A and 1B, first user device 110 may form registration request 102 based on the second user device data 101. For example, registration request 102 may include information identifying: (1) first user device 110, (2) second user device 120, (3) an associated user, (4) payment information, (5) desired services to be provided to second user device 120, etc. First user device 110 may present an interface, such as a graphical user interface (GUI) that displays registration options and accepts inputs (e.g., via a mouse, not shown) from the user related to selecting information to include in registration request 102.

Continuing with environment 100 in FIGS. 1A and 1B, registration device 140 may process registration request 102. For example, registration device 140 may verify that payment information included in registration request 102 is valid and that an associated user is authorized to use the payment information. Registration device 140 may further verify that payment information included in registration request 102 is sufficient to pay for services to second user device 120 requested in registration request 102. In one implementation, registration device 140 may evaluate registration request 102 to identify first user device 110 and determine whether first user device 110 is previously registered. Registration device 140 may then register second user device 120 using data associated with first user device 110 (e.g., payment information associated with first user device 110).

After processing registration request 102 (e.g., verifying payment information to associate with second user device 120), registration device 140 may forward authorization data 103 to activation device 150. Authorization data 103 may include an indication that second user device 120 is eligible for activation. Authorization data 103 may also include information identifying second user device 120 and services requested by second user device 120 from a service provider. Registration device 140 may further include information in authorization data 103 that is not included and/or different from the data included in registration request 102. For example, authorization data 103 may include information collected by registration device 140 during the registration of first user device 110, such as a location and/or services associated with first user device 110.

Registration device 140 may further update account data to reflect the registration of second user device 120. For example, registration device 140 may store data indicating that second user device 120 is authorized to access services and/or data requested in second user device data 101.

Continuing with environment 100 in FIGS. 1A and 1B, activation device 150 may process authorization data 103 and determine activation data 104 to send to second user device 120. For example, activation data 104 may include instructions and/or data to activate second user device 120. Activation device 150 may determine the contents of activation data 104 based on the contents of authorization data 103. Activation device 150 may determine services and/or data requested by second user device 120 (e.g., in second user device data 101) and may include information in activation data 104 to enable second user device 120 to access the requested services and/or data. Activation data 104 may include an application that, when implemented by second user device 120, enables second user device 120 to access the requested services and/or data. For example, the application included with the activation data may activate a communication component (not shown in FIGS. 1A and 1B) included in second user device 120 and direct the activated communication component to acquire the requested services and/or data. In another example, activation data 104 may include an access code or other license that allows second user device 120 to access the requested services and/or data, such as digital contents (e.g., a movie or television show).

As shown in FIGS. 1A and 1B, registration network 130 may carry registration request 102 between first user device 110 and registration device 140, and activation network 160 may carry activation data 104 between activation device 150 and one or more of first user device 110 or second user device 120.

Registration network 130 and activation network 160 may include, for example, one or more wired, wireless and/or optical networks that are capable of receiving and transmitting data, voice and/or video signals, including multi-media signals that include voice, data and video information. For example, registration network 130 and activation network 160 may include one or more public switched telephone networks (PSTNs) or other type of switched network. Registration network 130 and activation network 160 may also include one or more wireless networks and may include a number of transmission towers for receiving wireless signals and forwarding the wireless signals toward the intended destinations. Registration network 130 and activation network 160 may alternatively include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

In one implementation, registration network 130 and activation network 160 are different networks. For example, registration network 130 and activation network 160 may operate on different transmission media and/or protocols.

As shown in FIG. 1A, activation device 150 may forward activation data 104 to first user device 110 via an activation network 160, and first user device 110 may forward activation data 104 to second user device 120. Second user device 120 may use the activation data 104 to activate, such as to access to limited network resources. Alternatively, as shown in FIG. 1B, activation device 150 may forward activation data 104 to directly to second user device 120 via activation network 160.

The exemplary configurations illustrated in FIGS. 1A and 1B are provided for simplicity. It should be understood that environment 100 may be more complex and include more or fewer devices than those illustrated in FIGS. 1A and 1B. For example, environment 100 may also include additional elements, such as switches, gateways, routing devices, backend systems, etc., that aid in routing information between first and second user devices 110 and 120, registration device 140, and activation device 150. Also, in some instances, one or more of the components of environment 100 may perform one or more functions described as being performed by another one or more of the components of environment 100. For example, activation device 150 may be included as a component of registration device 140.

FIGS. 2A-2C show exemplary connections coupling first user device 110 and second user device 120 in environment 100. As described with respect to FIGS. 1A and 1B, first user device 110 and second user device 120 may couple to exchange second user device data 101, activation data, etc.

In the implementation shown in FIG. 2A, first user device 110 may include a headphone jack 210 to receive an audio interface 220 that may be included in second user device 120. Audio interface 220 may include a first input (or left audio) terminal 222, a second input (or right audio) terminal 224, an output (or microphone) terminal 226, and a grounding terminal 228 that may electrically connect to a grounding terminal in headphone jack 210. When audio interface 220 is coupled to headphone jack 210 (e.g., audio interface 220 is inserted into headphone jack 210 in direction 201), second user device 120 may (1) receive data (e.g., activation data 104) from first user device 110 via one of first input terminal 222 or second input terminal 224; and (2) transmit data (e.g., second user device data 101) to first user device 110 via output terminal 226. Accordingly, in one implementation, second user device 120 may receive power from first user device 110 via one of first input terminal 222 or second input terminal 224 (i.e., the one of first input terminal 222 or second input terminal 224 not used to transmit data from first user device 110 to second user device 120.

In another implementation shown in FIG. 2B, first user device 110 may include a first input port 230, and second user device 120 may include a second input port 240. For example, ports 230 and 240 of first user device 110 and second user device 120 may be a universal serial bus (USB) or other type of data port.

A cable 250 may include a first end 252 that couples to first input port 230 (e.g., inserted into first input port 230 in direction 202), and a second end 254 that couples to second input port 240 (e.g., inserted into second input port 240 in direction 203) to enable data (e.g., second user device data 101 and/or activation data 104) to be exchanged between first user device 110 and second user device 120.

In an implementation shown in FIG. 2C, first user device 110 may include a first transmission unit 260, and second user device 120 may include a second transmission unit 270. First transmission unit 260 and second transmission unit 270 may interact to provide a short-range wireless connection 280 (e.g., WiFi®, Bluetooth®, etc.) between first transmission unit 260 and second transmission unit 270. Short-range wireless connection 280 may carry data to be exchanged between first user device 110 and second user device 120 (e.g., second user device data 101 and/or activation device activation data 104).

The exemplary configurations illustrated in FIGS. 2A-2C are intentionally simple to enhance clarity of presentation. It should be understood that a connection between first user device 110 and second user device 120 may include more or fewer devices than those illustrated in FIGS. 2A-2C. For example, wireless connection 280 may be transferred by additional elements, such as switches, gateways, routing devices, backend systems, etc., that aid in routing information between first and second user devices 110 and 120.

FIG. 3 is a schematic diagram that shows exemplary components of a device 300 that may correspond to first user device 110 or second user device 120. As shown in FIG. 3, device 300 may include, for example, a processing unit 310, a memory 320, a user interface 330, a communication interface 340, and an antenna assembly 350. Although FIG. 3 shows example components of device 300, in other implementations, device 300 may include fewer components, additional components, different components, or differently arranged components than depicted in FIG. 3. In still other implementations, one or more components of device 300 may perform one or more tasks described as being performed by one or more other components of device 300.

A processing unit 310 may include a processor, a microprocessor, an ASIC, a FPGA, or the like. A processing unit 310 may control operation of device 300 and its components. In one implementation, a processing unit 310 may control operation of components of device 300 in a manner similar to that described herein. Memory 320 may include a RAM, a ROM, and/or another type of memory to store data and/or instructions that may be used by a processing unit 310. User interface 330 may include mechanisms for inputting information to device 300 and/or for outputting information from device 300. Examples of input and output mechanisms might include buttons (e.g., control buttons, keys of a keypad, a keyboard, a joystick, etc.); a touch screen interface to permit data and control commands to be input into device 300 via a touch screen; a biometric device to receive fingerprint scans, retinal scans, facial signatures, etc.; a speaker (e.g., a speaker operated by an audio interface) to receive electrical signals and output audio signals; a microphone (e.g., a microphone operated in conjunction with signals on terminal 226) to receive audio signals and output electrical signals; a display (e.g., a touch screen) to output visual information (e.g., user interfaces, web pages, etc.); a vibrator to cause device 300 to vibrate; and/or a camera (e.g., a camera) to receive video and/or images.

Communication interface 340 may include, for example, a transmitter that may convert baseband signals from a processing unit 310 to RF signals and/or a receiver that may convert RF signals to baseband signals. Alternatively, communication interface 340 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network.

As described in detail below, device 300 may perform certain operations described herein in response to a processing unit 310 executing software instructions of an application contained in a computer-readable medium, such as memory 320. The software instructions may be read into memory 320 from another computer-readable medium or from another device via communication interface 340. The software instructions contained in memory 320 may cause a processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 depicts exemplary components of device 300, in other implementations, device 300 may include fewer components, additional components, different components, or differently arranged components than those illustrated in FIG. 3. Furthermore, one or more components of device 300 may perform one or more tasks described as being performed by one or more other components of device 300.

Figure 4:
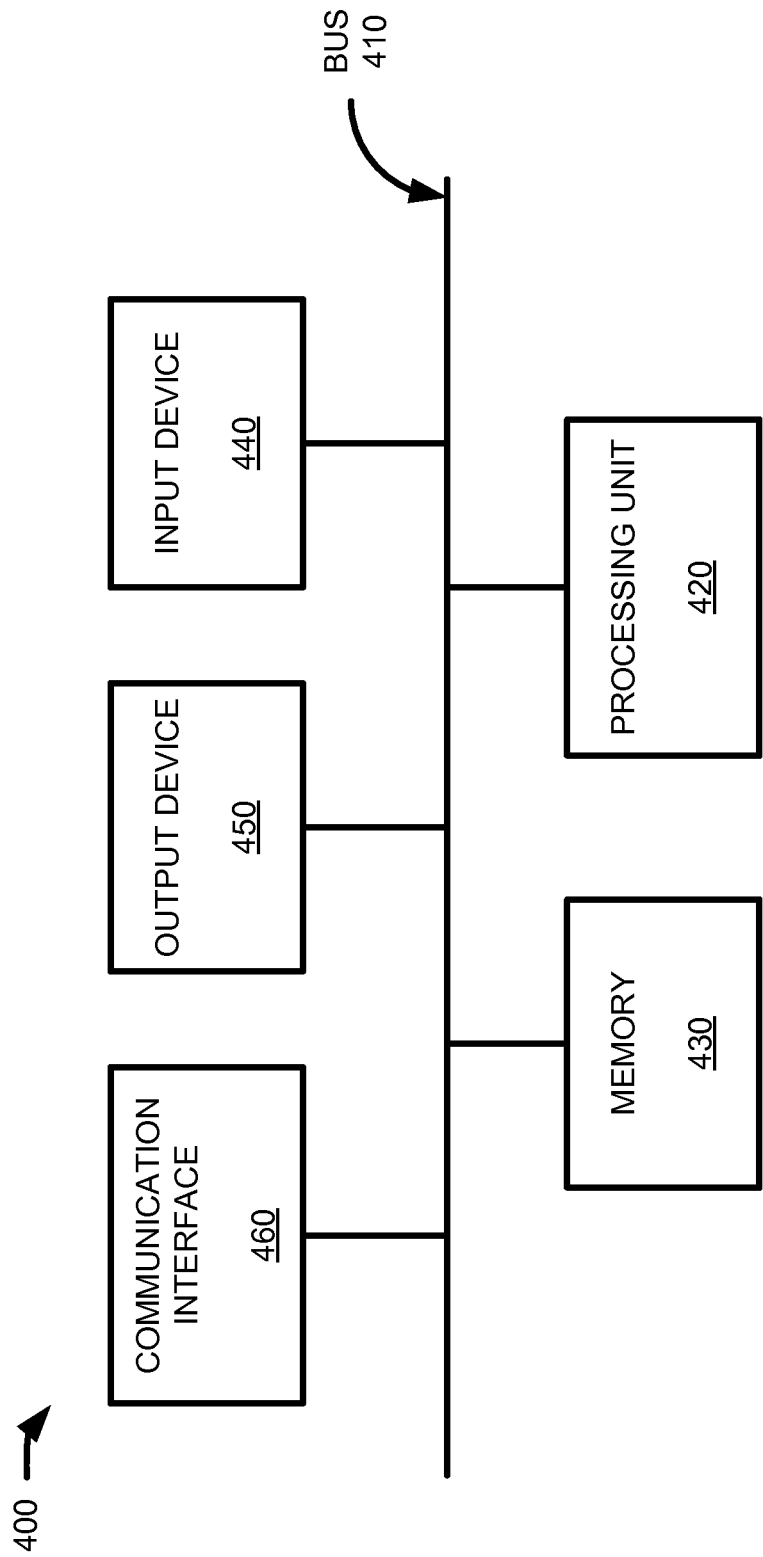
FIG. 4 shows a diagram of exemplary components that may be included in a computing device included in the environment shown in FIG. 1.

FIG. 4 is a diagram illustrating exemplary components of a device 400. Device 400 may correspond, for example, to registration device 140 or activation device 150 and may be implemented/installed as a combination of hardware and software on one or more devices 400. As shown in FIG. 4, device 400 may include, for example, a bus 410, a processing unit 420, a memory 430, one or more input devices 440, one or more output devices 450, and a communication interface 460.

Bus 410 may permit communication among the components of device 400. Processing unit 420 may include one or more processors or microprocessors that interpret and execute instructions. In other implementations, processing unit 420 may be implemented as, or include, one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits a user to input information to device 400, such as a keyboard, a keypad, a mouse, a pen, a microphone, one or more biometric mechanisms, and the like. Output device 450 may include a device that outputs information to the user, such as a display, a speaker, etc.

Communication interface 460 may include any transceiver-like mechanism that enables device 400 to communicate with other devices and/or systems. For example, communication interface 460 may include mechanisms for communicating with other devices, such as other devices of network environment 100. In one implementation, communications interface 460 may support short range wireless network communications (e.g., via Bluetooth protocols). In another implementation, communications interface 460 may support long range wireless network communications (e.g., cellular network services). In other implementations, communication interface 460 may support other wired or wireless network communications.

As described herein, device 400 may perform certain operations in response to processing unit 420 executing software instructions stored in a computer-readable medium, such as memory 430. A computer-readable medium may include a non-transitory tangible memory device. A memory device may be implemented within a single physical memory device or spread across multiple physical memory devices. The software instructions may be read into memory 430 from another computer-readable medium or read into memory 430 from another device via communication interface 460. The software instructions stored in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, differently-arranged components, or additional components than those depicted in FIG. 4. As an example, in some implementations, a display may not be included in device 400. In these situations, device 400 may be a "headless" device that does not include input device 440. Alternatively, or additionally, one or more components of device 400 may perform one or more other tasks described as being performed by one or more other components of device 400.

Figure 5:
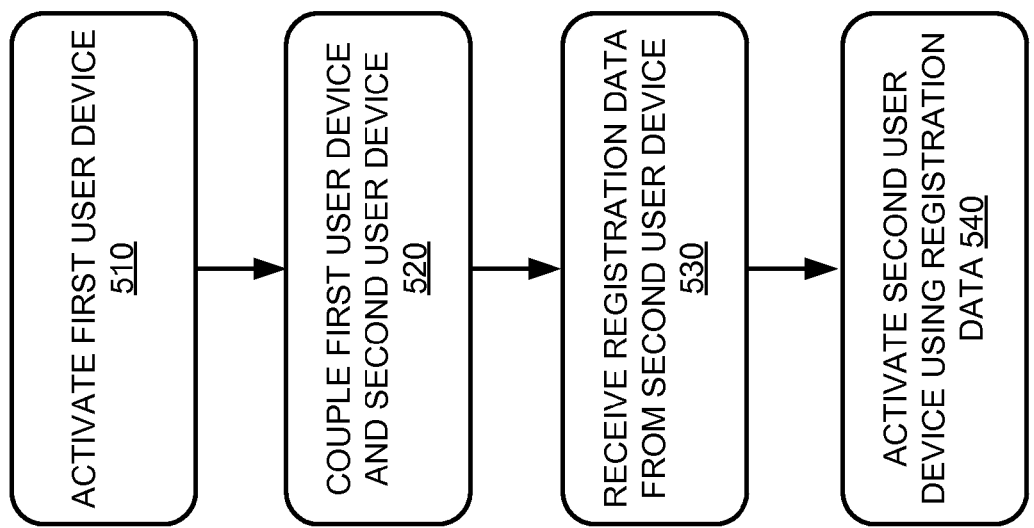
FIGS. 5-7 show flow diagrams of an exemplary process for activating a user device included in the environment shown in FIG. 1.

FIG. 5 is a flow diagram illustrating an exemplary process 500 for a user-initiated activation of second user device 120. In one implementation, process 500 may be performed by first user device 110 in combination with second user device 120. In other implementations, process 500 may be performed by one or more other devices of environment 100, such as registration device 140 and/or activation device 150.

As shown in FIG. 5, process 500 may include activating first user device 110 (block 510). For example, first user device 110 may be activated by a representative of an associated service provider or a vendor of the first user device 110.

Figure 6:
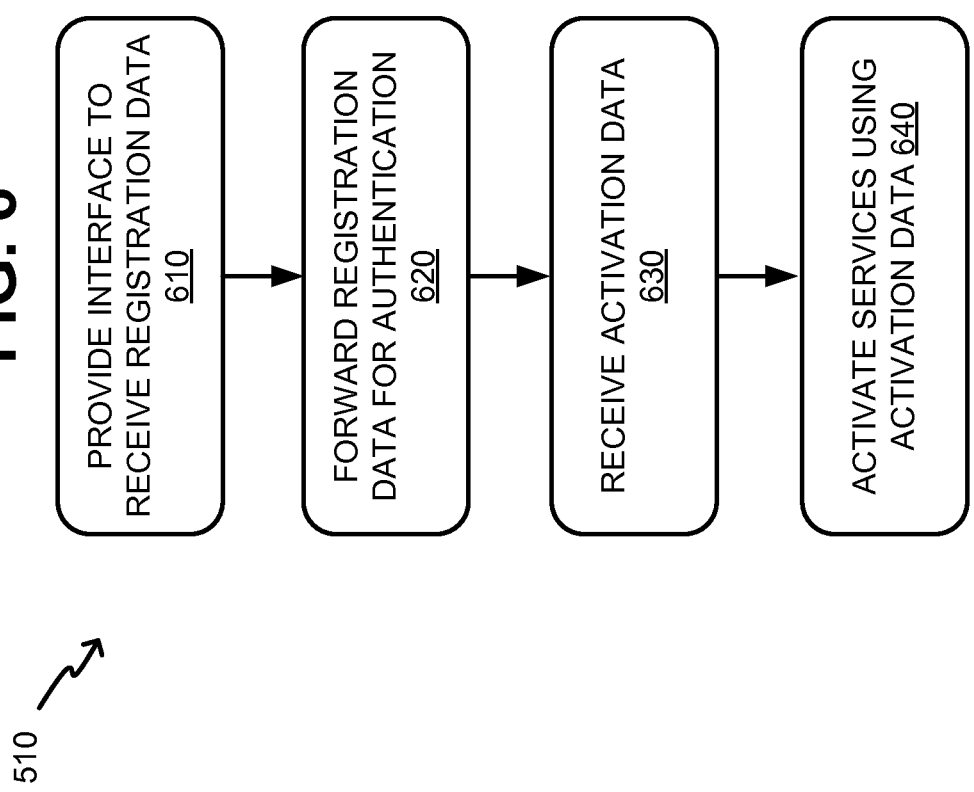

In one implementation, activation of the first user device 110 may be initiated by an associated user. FIG. 6 is a flow diagram illustrating an exemplary process 600 for a user-initiated activation of first user device 110. In one implementation, process 600 may be performed by first user device 110. In other implementations, process 600 may be performed by one or more other devices of environment 100, such as second user device 120, registration device 140, and/or activation device 150.

As shown in FIG. 6, process 600 may include providing an interface to receive registration data (block 610). For example, first user device 110 may provide in interface to prompt the associated user to submit requested data related to registering first user device 110.

Figure 7:
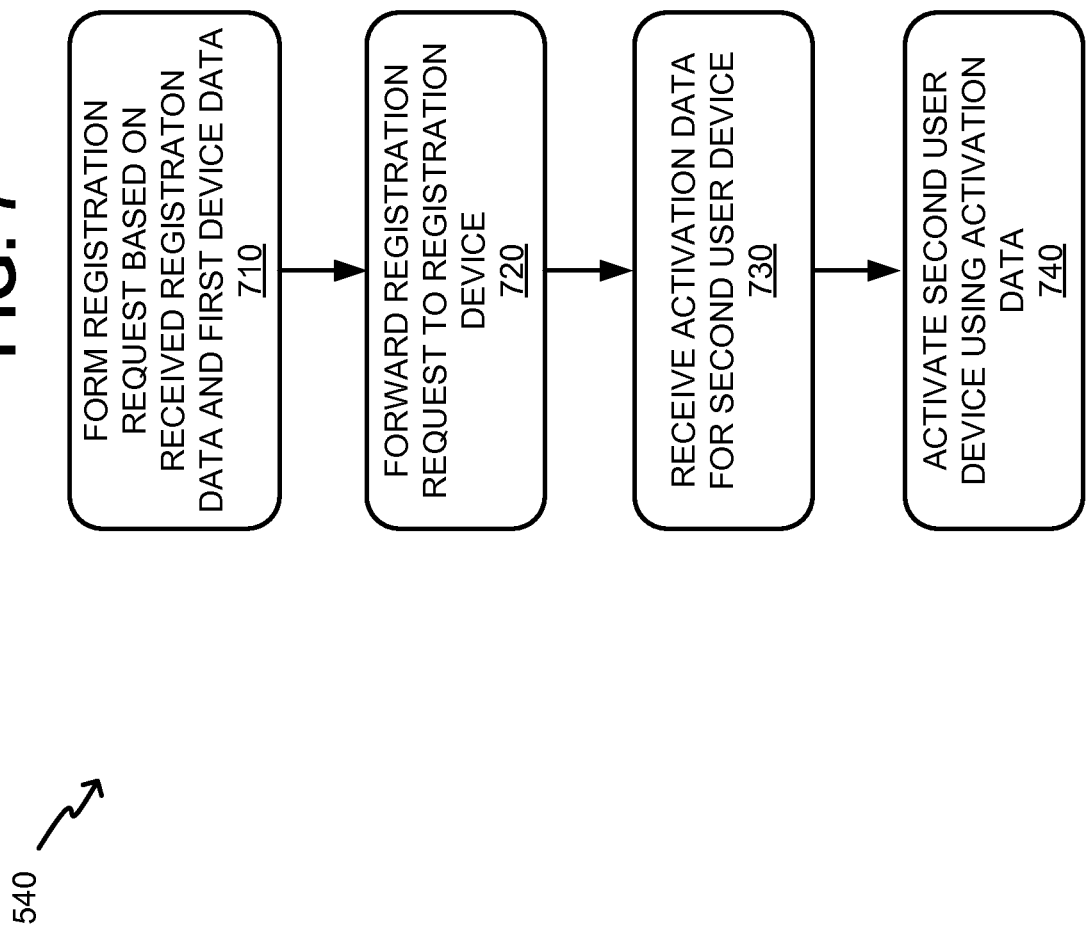
Figure 8:
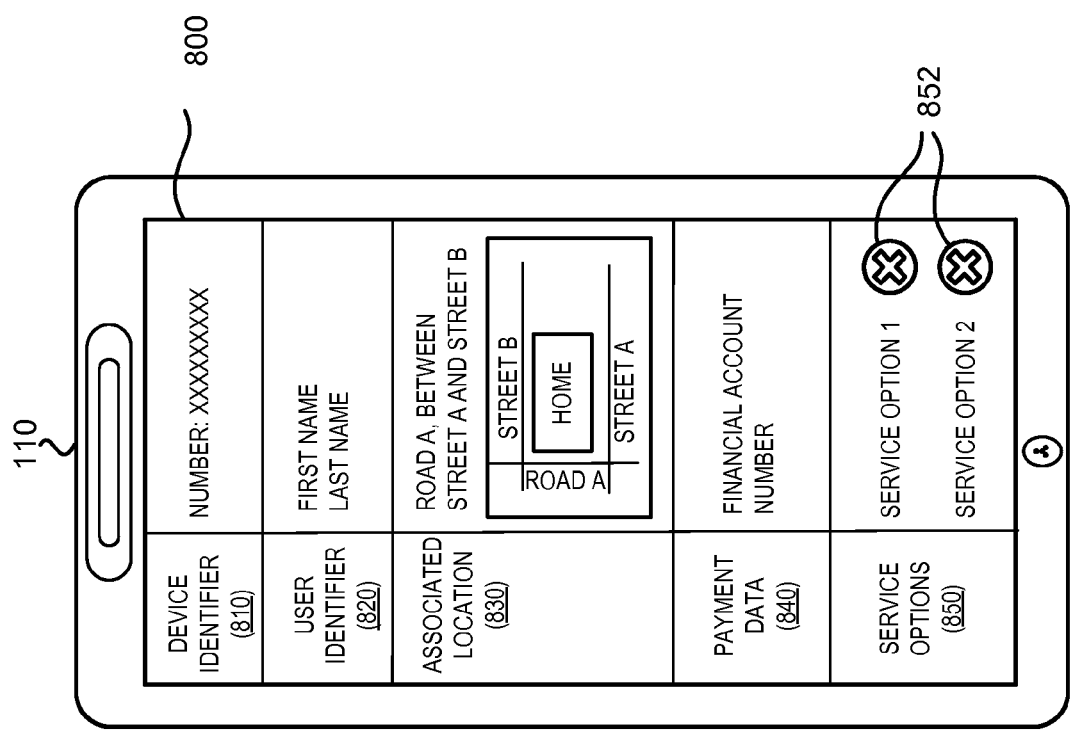
FIGS. 8 and 9 show exemplary interfaces that may be presented for display to a user device included in the environment of FIG. 1 in connection with activating another user device included in the environment of FIG. 1.

Skipping FIG. 7 for the moment, an exemplary first registration interface 800, which may be provided by first user device 110, is shown in FIG. 8. First registration interface 800 may include, for example, a first device identifier field 810 to receive a user input specifying an identifier (e.g., a serial number, an IMEI number, a MEID) associated with first user device 110 (shown FIG. 8 as "Number: XXXXXXXX"). First registration interface 800 may further include, for example, a first user identifier field 820 to receive a user input identifying an associated user (shown in FIG. 8 as "First Name, Last Name") and an first associated location field 830 to receive a user input identifying a location associated with the user (shown in FIG. 8 as "ROAD A, BETWEEN STREET A AND STREET B"). In one implementation shown in FIG. 8, first associated location field 830 may further provide a map providing a graphical representation of the identified location.

Continuing with FIG. 8, first registration interface 800 may further include, for example, a first payment data field 840 to receive user input identifying payment information associated with the user (shown in FIG. 8 as "FINANCIAL ACCOUNT NUMBER"). For example, first payment data field 840 may receive a credit card number or other information used to charge the associated user (identified in first user identifier field 820).

First user device 110 may verify first payment data field 840. For example, first user device 110 may determine whether the financial account numbers specified in first payment data field 840 are associated with data provided in first user identifier field 820 and/or first associated location field 830. To verify first payment data field 840, first user device 110 may forward information collected in first registration interface 800 to another device, such as registration device 140, for verification.

In one implementation, first device identifier field 810, first user identifier field 820, first associated location field 830, and first payment data field 840 may be automatically determined by first user device 110 (i.e., without a user input). For example, first user device 110 may populate first registration interface 800 based on data stored by first registration interface 800, by (1) determining the contents of first device identifier field 810 based on stored device information; (2) determining the contents of first user identifier field 820 and first associated location field 830 based on stored contact information; and/or (3) determining the contents of first payment data field 840 based on stored financial information.

Continuing with FIG. 8, first registration interface 800 may include first service option field 850 (shown in FIG. 8 as "SERVICE OPTION 1" and "SERVICE OPTION 2"). The contents of first service option field 850 may be determined by first user device 110 (or another device such as registration device 140) based on other data collected in first registration interface 800. For example, first service option field 850 may identify service options available to a device type associated with first user device 110 (based on first device identifier field 810) at the location specified in first associated location field 830.

As further shown in FIG. 8, first service option field 850 may include one or more graphical elements 852 that a user may select (e.g., by submitting a particular input, touching an associated portion of a touch screen, etc.) to select from first service option field 850.

As noted above, an exemplary first registration interface 800 is shown in FIG. 8. It should be appreciated that first registration interface 800 is provided purely for purposed of example, and first registration interface 800 may include additional, fewer, or different fields of information. Furthermore, it should be appreciated that first registration interface 800 may be modified to reposition fields 810-850.

Returning to FIG. 6, process 600 may include forwarding the registration data for authentication (block 620), and receiving activation data (block 630). For example, first user device 110 may forward the registration data collected in block 610 (e.g., via first registration interface 800) to registration device 140, and activation device 150 may forward data, for receiving, by second user device 120 directly through activation network 160 or indirectly through activation network and first user device 110 for activating second user device 120. For example, activation device 150 may provide information and/or programs to enable the service options selected via service option field 850.

Continuing with FIG. 6, process 600 may include accessing services using the activation data (block 640). First user device 110 may use the activation data received in block 630 to enable the service options selected via service option field 850. For example, the activation data may enable first user device 110 which may be configured to access desired services. For example, the activation data may activate a component of first user device 110 to enable communication via a network or to access particular data.

Returning to FIG. 5, process 500 may include coupling second user device 120 to the activated first user device 110 (block 520). For example, as described above with respect to FIG. 2A, second user device 120 may include a component (e.g., audio interface 220) that connects to a component of first user device 110 (e.g., headphone jack 210). In other examples described above with respect to FIGS. 2B and 2C, first user device 110 and second user device 120 may also connect via a wired connection (e.g., wire 250) or a wireless connection (e.g., short-range wireless connection 280.

Continuing with FIG. 5, process 500 may include first user device 110 receiving registration data from second user device 120 (block 530). For example, first user device 110 may interact with second user device 120 to obtain second user device data 101, such as a device identifier associated with second user device 120.

Figure 9:
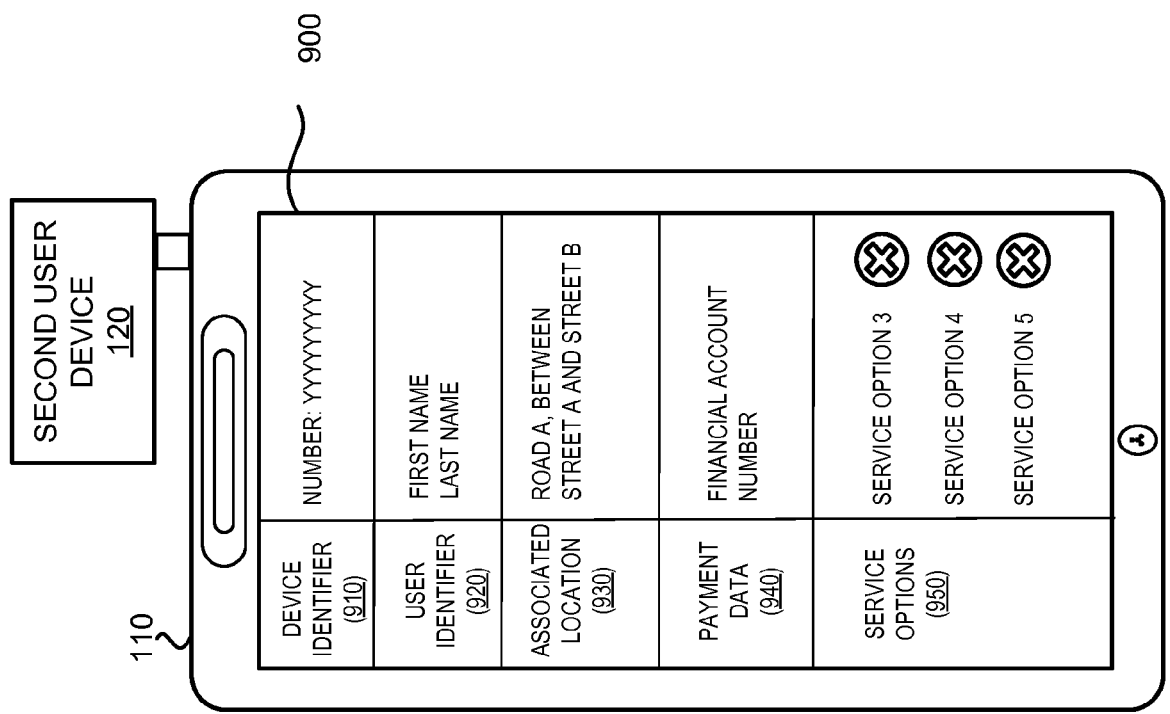

In one implementation, when receiving registration data from second user device 120 in process block 530, first user device 110 may provide an exemplary second registration interface 900, as shown in FIG. 9. Second user device 120 is shown connected to second registration interface 900 in FIG. 9, as described above with respect to FIG. 2A, but it should be appreciated that first user device 110 and second user device 120 may communicate in other ways, such as the implementations discussed with respect to FIGS. 2B and 2C. Second registration interface 900 may include, for example, a second device identifier field 910 to present an identifier (e.g., a serial number, an IMEI number, a MEID) associated with second user device 120 (shown FIG. 9 as "Number: YYYYYYYY"). For example, first user device 110 may determine the contents of second device identifier field 910 based on device information stored by second user device 120.

Continuing with FIG. 9, second registration interface 900 may further include, for example, (1) a second user identifier field 920 identifying an associated user (shown in FIG. 9 as "First Name, Last Name"); (2) an second associated location field 930 identifying a location associated with the user (shown in FIG. 9 as "ROAD A, BETWEEN STREET A AND STREET B"); and (3) a second payment data field 940 identifying payment information associated with the user (shown in FIG. 9 as "FINANCIAL ACCOUNT NUMBER"). For example, second payment data field 940 may present a credit card number or other information used to charge the associated user (identified in second user identifier field 920).

In one implementation, first user device 110 may populate portions of second registration interface 900 based on data associated with first user device 110, such as data obtained via first registration interface 800. For example, second user identifier field 920, second associated location field 930, and second payment data field 940 may correspond, respectively, first user identifier field 820, first associated location field 830, and first payment data field 840.

Continuing with FIG. 9, second registration interface 900 may include second service option field 950 (shown in FIG. 9 as "SERVICE OPTION 3," "SERVICE OPTION 4," and "SERVICE OPTION 5"). The second service option field 950 may be determined by first user device 110 (or another device such as registration device 140) based on second user device data 101 from second user device 120. For example, second service option field 950 may identify service options available to a device type associated with second user device 120 (determined based on second device identifier field 910) at the location specified in second associated location field 930.

In one implementation, service options identified in second service option field 950 may further be identified based on information associated with first user device 110. For example, services available to second user device 120 may depend on account information, a location, prior activity, financial information, etc. associated with a user of first user device 110.

As noted above, exemplary second registration interface 900 is shown in FIG. 9. It should be appreciated that second registration interface 900 is provided purely for purposed of example, and second registration interface 900 may include additional, fewer, or different fields of information. Furthermore, it should be appreciated that second registration interface 900 may be modified to reposition fields 910-950.

Returning to FIG. 5, process 500 may further include registering second user device 120 using the registration data received in process block 530 (block 540). For example, first user device 110 may forward information identifying an associated user and linking second user device 120 with the identified user.

FIG. 7 is a flow diagram illustrating an exemplary process 700 for activating second user device 120 in process step 540. In one implementation, process 700 may be performed by first user device 110. In other implementations, process 700 may be performed by one or more other devices of environment 100, such as second user device 120, registration device 140, and/or activation device 150.

As shown in FIG. 7, process 700 may include forming a registration request 102 based on the received registration data (block 710). For example, registration request 102 may include information linking first user device 110 and second user device 120. For example, second user device 120 may be activated based on account information associated with first user device 110. In another example, the registration request may include technical information associated with first user device 110 and/or second user device 120, such as information identifying included components, etc.

Continuing with FIG. 7, process 700 may include forwarding registration request 102 to registration device 140 (block 720). For example, as described above with respect to FIGS. 1A and 1B, first user device 110 may forward registration request 102 to registration device 140 via registration network 130, and registration device 140 may generate authorization data 103 to forward to activation device 150.

Continuing with FIG. 7, process 700 may include receiving activation data 104 for second user device 120 (block 730)

and activating second user device 120 using activation data 104 (block 740). For example, as described above with respect to FIG. 1A, first user device 110 may receive activation data 104 from activation device 150 via activation network 160, and may forward activation data 104 to second user device 120. Alternatively, as described above with respect to FIG. 1B, second user device 120 may receive activation data 104 from activation device 150 via activation network 160, and may use activation data 104 to activate itself.

FIG. 10 shows an exemplary system 1000 in which user equipment (UE) 1010 (corresponding to the first user device 110 and location device 1020 (corresponding to the second user device 120) may operate based on processes 500, 600, and 700. In this example, UE 1010 may include, for example, to a smart phone, a mobile computer, tablet or other device that exchanges data with one or more of evolved nodes B (or eNodes B) 1030-1, 1030-2, . . . 1030-N (referred to collectively as eNodes B 1030 and individually as an eNode B 1030) and location device 1020. UE 1010 may further couple to location device 1020 to receive second user device data 101 (used to form a registration request 102 forwarded to an eNode B 1030) and to provide activation data 104 that is received from the eNode B 1030. For example, as described above with respect to FIG. 2A, UE 1010 may include a headphone jack adapted to receive audio interface 220 included in location device 1020.

In this example, registration request 102 may include information identifying UE 1010 and location device 1020, and eNode B 1030 may register UE 1010 and location device 1020 based on receiving registration request 102 and may forward network identifiers to UE 1010 and/or location device 1020 in activation data 104. eNode B 1030 may further store information associating UE 1010 and location device 1020

Location device 1020 may be a device that provides signaling to one or more eNode B 1030 to enable a position of location device 1020 to be determined. Location device 1020 may have limited communications and/or interface capabilities. Location device 1020 may include, for example, a battery and a mechanism (e.g., a transmitter) to forward a status signal to one or more eNodes B 1030. When coupled to UE 1010, the battery in location device 1020 may be charged, and location device 1020 may receive an associated network identifier included in activation data 104. Location device may send a presence message 1001 (e.g., a ping or other status notification) to one or more eNodes B 1030, and the presence message 1001 may include information associated with the network identifier for the location device 1020.

Based on receiving presence message 1001, an eNode B 1030 may determine the geographic position of location device 1020 (e.g., based on the contents of presence message 1001 and/or associated characteristics of presence message 1001). For example, eNodes B 1030 may determine the location of location device 1020 based on comparison of signal strengths, receipt times, etc., associated with receiving the presence message 1001 at the eNodes B 1030.

In one implementation, location device 1020 may include a mechanism to receive location information, such as a global positioning signal (GPS) from a GPS satellite, and location device 1020 may determine an associated geographical position based on the GPS signal. Location device 1020 may further include information in presence message 1001 identifying the associated geographical position.

In addition or alternatively, location device 1020 may include hardware/software to generate verifying information, such as authentication code that is periodically generated (e.g., every minute) using an encoded random key, or seed, and location device 1020 may include the verifying information in presence message 1001. For example, the encoded random key may related to the device identifier. ENode B 1030 may use knowledge of the encoded random key to verify and/or identify the location device 1020. For example, ENode B 1030 may perform a modulo operation based on a key associated with location device 1020 to decoded information included in the presence message 1001 to recover the device identifier or other information for location device 1020.

An eNode B 1030 may store information associating the determined geographic position with the network identifier associated with location device 1020 in a home location register (HLR), a central database containing details of subscriber devices that are authorized to access a core network, or other repository.

UE 1010 and eNode B 1030 may exchange location request information 1002 to determine the geographic position of location device 1020. For example, location request information 1002 may include information identifying UE 1010, and eNode B 1030 may determine that UE 1010 is associated with location device 1020 and is authorized to determine the position of location device 1020 based on previously received registration request 102. The eNode B may access the HLR to determine a most recent position of location device 1020 and report this potion to UE 1010.

Thus, in the example described in system 1000 shown in FIG. 10, location device 1020 may be registered with eNodes B 1030 without receiving any information from eNodes B 1030, thereby allowing location device 1020 to use a minimum amount of power. Furthermore, the position of location device 1020 can only be accessed by an authorized UE 1010.

In another implementation, another UE 1010 (not shown) may be registered with eNode B 1030 to access the position associated with a registered location device 1020. For example, an audio interface 220 for location device 1020 may be coupled to a headphone jack 210 associated with the other UE 1010, and the other UE 1010 may determine a device identifier for location device 1020 based the coupling. The other UE 1010 may then use the device identifier for location device 1020 to later request, from eNode B 1030, the position of location device 1020.

Although FIG. 10 depicts exemplary devices included in system 1000, in other implementations, system 1000 may include fewer devices, additional devices, different devices, or differently arranged devices than those illustrated in FIG. 10. Furthermore, one or more devices of system 1000 may perform one or more tasks described as being performed by one or more other devices of system 1000.

While a series of blocks has been described with respect to FIGS. 5-7, the order of the blocks in processes 500, 600, and 700 may be modified in other implementations. Furthermore, non-dependent blocks may be performed in parallel. Furthermore, processes 500, 600, and 700 may include additional and/or fewer blocks than shown in FIGS. 5-7. For example, the activation of the first user device 110 in process 600 may further include capturing an image of the associated user and verifying that the captured image corresponds to another image of the user in a driver's license or other identification of the user of first user device 110.

Also, various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, in another implementation, second user device 120 may include a sensor, such as a card reader, to receive payment information to be applied with respect to activating second user device 120.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   acquiring, by a first user device, device data associated with a second user device, wherein the second user device is not configured to communicate with a registration device when the device data is acquired, wherein the first user device includes a headphone jack and the second user device includes an audio interface, wherein the audio interface is configured to be inserted into the headphone jack to couple the first user device and the second user device, and wherein the audio interface includes a first input terminal;
   forming, by the first user device, a registration request that includes the device data associated with the second user device and information associated with the first user device, wherein the information associated with the first user device identifies an associated user;
   forwarding, by the first user device, the registration request to the registration device, wherein the registration device authenticates the second user device based on the information associated with the first user device, and wherein activation data is determined based on the registration device authenticating the second user device;
   receiving, by the first user device, the activation data; and
   forwarding, by the first user device, the activation data to the second user device via the first input terminal, wherein the second user device uses the activation data to become active, wherein the second user device, when active, forwards a location message that is used to determine a geographic position of the second user device, and wherein the first user device uses data from the registration request to access information identifying the geographic position of the second user device.

2. The method of claim 1, wherein a data path is formed between the first user device and the second user device based on the audio interface being inserted into the headphone jack, and
   wherein acquiring the device data associated with the second user device further includes:
   transferring the device data to the first user device from the second user device via the data path.

3. The method of claim 1, wherein forming the registration request further includes:
   providing a first interface to receive the information associated with the first user device.

4. The method of claim 3, wherein forming the registration request further includes:
   providing a second interface to receive data related to the registration request, wherein portions of the second interface are automatically populated with the information associated with the first user device.

5. The method of claim 1, wherein the second user device is a headless device.

6. The method of claim 1, wherein the device data associated with the second user device identifies at least one of:
   a model number associated with the second user device,
   a manufacturer associated with the second user device,
   a serial number associated with the second user device,
   an international mobile station equipment identity (IMEI) number associated with the second user device,
   a mobile equipment identifier (MEID) associated with the second user device, or
   a service or a resources requested by the second user device.

7. The method of claim 1, wherein the first user device forwards the registration request to the registration device via a first network, and the first user device receives the activation data via a second network that differs from the first network, wherein the second user device is not configured to access the first network prior to the second user device becoming active.

8. The method of claim 1, wherein the audio interface further includes a second input terminal, and wherein the method further includes:
   providing power to the second user device via the second input terminal.

9. A first user device comprising:
   a memory configured to store information associated with the first user device;
   a headphone jack; and
   a processor configured to:
      acquire device data associated with a second user device, wherein the second user device is not configured to communicate with a registration device when the device data is acquired, wherein the second user device includes an audio interface, wherein the audio interface is configured to be inserted into the headphone jack to couple the first user device and the second user device, wherein the audio interface includes an output terminal, and wherein the processor is further configured to acquire the device data via the output terminal
      form a registration request that includes the device data associated with the second user device and the information associated with the first user device, wherein the information associated with the first user device identifies an associated user, and forward the registration request to the registration device, wherein the registration device authenticates the second user device based on the information associated with the first user device, wherein activation data is determined based on the registration device authenticating the second user device, wherein the second user device is configured to receive the activation data and to become active using the activation data, and wherein the second user device, when active, forwards a location message that is used to determine a geographic position of the second user device, and the first user device uses data from the registration request to access information identifying the geographic position of the second user device.

10. The first user device of claim 9, wherein the processor, when acquiring the device data associated with the second user device, is further configured to:

establish a data path for transferring the device data to the first user device from the second user device.

11. The first user device of claim 9, wherein the processor is further configured to:

provide a first interface to receive the information associated with the first user device.

12. The first user device of claim 11, wherein the processor is further configured to:

provide a second interface to receive data related to the registration request, wherein portions of the second interface are automatically populated based on the information associated with the first user device obtained via the first interface.

13. The first user device of claim 12, wherein the second interface identifies service options available to the second user device, and wherein the service options available to the second user device are determined based on service options available to the first user device.

14. The first user device of claim 9, wherein the audio interface includes a first input terminal, and wherein the processor is further configured to:
receive the activation data, and
forward the activation data to the second user device via the first input terminal.

15. The first user device of claim 14, wherein the audio interface further includes a second input terminal, and wherein the processor is further configured to:
provide power to the second user device via the second input terminal.

16. A non-transitory computer-readable medium to store instructions, the instructions comprising:

one or more instructions that when executed by a first user device, cause the first user device to:

acquire device data associated with a second user device, wherein the first user device includes a headphone jack, the second user device includes an audio interface, and the audio interface is configured to be inserted into the headphone jack to couple the first user device and the second user device, wherein the audio interface includes an output terminal, and wherein the one or more instructions further cause the first user device to acquire the device data via the output terminal, form a registration request that includes the device data associated with the second user device and information associated with the first user device, and forward the registration request to a registration device, wherein the registration device authenticates the second user device based on the information associated with the first user device, wherein activation data is determined based on the registration device authenticating the second user device, wherein the second user device is configured to receive the activation data and to become activated using the activation data, and wherein the second user device, when active, forwards a location message that is used to determine a geographic position of the second user device, and the first user device uses data from the registration request to access information identifying the geographic position of the second user device.

17. The non-transitory computer-readable medium of claim 16, wherein the audio interface includes a first input terminal, and wherein the one or more instructions further cause the first user device to:
receive the activation data, and
forward the activation data to the second user device via the first input terminal.

18. The non-transitory computer-readable medium of claim 17, wherein the audio interface further includes a second input terminal, and wherein the one or more instructions further cause the first user device to:
provide power to the second user device via the second input terminal.

19. The non-transitory computer-readable medium of claim 16, wherein the instructions further include:

one or more instructions that when executed by the first user device, cause the first user device to:
provide an interface to receive data related to the registration request, wherein portions of the interface are automatically populated based on the information associated with the first user device.

20. The non-transitory computer-readable medium of claim 16, wherein the device data associated with the second user device identifies at least one of:

a model number associated with the second user device,
a manufacturer associated with the second user device,
a serial number associated with the second user device,
an international mobile station equipment identity (IMEI) number associated with the second user device,
a mobile equipment identifier (MEID) associated with the second user device, or
a service or a resources requested by the second user device.

* * * * *